United States Patent [19]

Larsen

[11] 3,959,103

[45] May 25, 1976

[54] PHOTOCURING OF UNSATURATED POLYESTER/POLYTHIOL COMPOSITIONS

[75] Inventor: Donald Wayne Larsen, Marriottsville, Md.

[73] Assignee: W. R. Grace & Co., New York, N.Y.

[22] Filed: Sept. 17, 1973

[21] Appl. No.: 397,521

Related U.S. Application Data

[63] Continuation-in-part of Ser. No. 118,526, Feb. 24, 1971, abandoned, which is a continuation-in-part of Ser. No. 827,075, May 22, 1969, abandoned.

[52] U.S. Cl. .............. 204/159.19; 204/159.14; 204/159.15; 204/159.18; 204/159.23; 204/159.24; 260/75 T; 260/75 S; 260/75 UA; 260/78 UA; 260/78 SC; 260/79.5 C; 260/857 R; 260/860; 260/865; 526/319
[51] Int. Cl.[2] ............... C08G 18/00; C08G 63/00
[58] Field of Search .............. 204/159.18, 159.19, 204/159.23, 159.14; 260/79.5 C, 79, 78 UA, 78 SC, 75 T, 75 S, 75 UA

[56] References Cited
UNITED STATES PATENTS

| | | | |
|---|---|---|---|
| 3,503,940 | 3/1970 | Oswald | 260/79 |
| 3,513,132 | 5/1970 | Edmonds | 260/75 |
| 3,592,798 | 7/1971 | Oswald | 260/79 |
| 3,661,744 | 5/1972 | Kehr et al. | 204/159.14 |
| 3,697,622 | 10/1972 | Kehr et al. | 204/159.18 |

*Primary Examiner*—Richard B. Turer
*Attorney, Agent, or Firm*—Richard P. Plunkett; Kenneth E. Prince

[57] ABSTRACT

A polar unsaturated polyester is photocured by irradiating (ultraviolet radiation) an admixture of a polythiol, an unsaturated polyester, and a photocuring rate accelerator. The unsaturated polyester is prepared by reacting mono- or polycarboxylic acids with mono- or polyhydric alcohols. The double bonds are furnished by any of these components. At least one of the double bonds is situated internally to the main backbone chain of the polyester. The photocure is achieved by the addition of the sulfhydryl groups of the polythiol to the reactive double bonds of the polyester.

8 Claims, No Drawings

PHOTOCURING OF UNSATURATED POLYESTER/POLYTHIOL COMPOSITIONS

This application is a continuation-in-part of copending application having Ser. No. 118,526, filed Feb. 24, 1971, now abandoned, which in turn is a continuation-in-part of application having Ser. No. 827,075, filed May 22, 1969, now abandoned.

BACKGROUND OF THE INVENTION

1. Objectives of the Invention

It is an objective of this invention to provide an improved method to cure polar unsaturated polyester, or polyimides. Other objectives will be obvious to those skilled in the art.

2. Prior Art

It is well known that unsaturated polyester resins can be cured to their final form by the copolymerization of the unsaturated polyesters with one or a mixture of vinyl-type monomers (which can also serve as the solvent for the polyesters). The result is a highly usually crosslinked polymeric substance. The crosslinking is achieved with the aid of an initiator which is also termed a "catalyst" or "accelerator". Initiation of curing is done conventionally by including an addition polymerization or copolymerization of the various species of unsaturated carbon-to-carbon double bonds in the resin composition. This chain reaction is triggered by one of several means. Simple application of heat (thermal activation) can be used. Normally, this means of initiation is uncontrollable and, in addition, leads to short shelf life for compositions stored even at room temperature. Because of shelf life problems, the compositions are (in practice) treated with thermal initiation inhibitors, and therefore heat is not used in known commercial operations as the sole means of activating the crosslinking reaction.

A second known means of triggering the vinyl addition polymermization and crosslinking of polyesters is through the use of certain wavelengths of light. This technique is also considered to be impractical for the commercial curing of these types of resins (see Lawrence, John R., *Polyester Resins*, Reinhold Publishing Corporation, New York, 1960, page 91).

The most widely used means of initiating the cure of unsaturated polyester resins is the use of so-called chemical free radical "catalysts" which decompose into highly active free radicals that initiate the free radical polymerization and crosslinking.

There is generally little or no homopolymerization of the vinyl-type monomer, .e.g, styrene, unless there is a very high proportion of the vinyl-type monomer present.

Unsaturated polyesters have also been cured by gammairradiation of the polyesters whereby there is random intramolecular crosslinking with, in some cases, radiation induced chain growth.

BROAD DESCRIPTION OF THE INVENTION

The unsaturated polyesters, of this invention are photocured by admixing the unsaturated polyesters, with a polythiol and a photocuring rate accelerator, and then irradiating the admixture with actinic radiation containing a substantial amount of ultraviolet radiation.

The polar unsaturated polyester, contains at least two reactive unsaturated carbon to carbon bonds per molecule, at least one of which is situated internally to the main backbone chain of the molecule, and is prepared from a combination of saturated and/or unsaturated mono- or polycarboxylic acids, saturated and/or unsaturated anhydrides, saturated and/or unsaturated mono- or polyhydric alcohols. A polyester, is defined herein as a compound that contains two or more ester, groups per molecule and is intended to include quite simple molecules as well as the higher molecular weight polymeric materials normally implied by these terms. A typical unsaturated polyester, diallyl maleate, contains two ester groups, one internal double bond in the maleate backbone and two terminal bonds in the allyl groups. Equally acceptable is the polymeric polyester, dipropylene glycol maleate which can have many internal double bonds per molecule depending on the extent of polymerization.

The polythiol contains at least two thiol or sulfhydryl groups. The photocuring is achieved by the addition of the sulfhydryl groups of the polythiol to the reactive unsaturated carbon to carbon groups of the unsaturated polyester, to form thioether linkages. The polythiol is present in the composition in an amount between about 5 and about 70% by weight; the unsaturated polyester, is present in an amount between about 30 and about 95% by weight; and the photocuring rate accelerator is present in an amount between about 0.0005 to 10%, preferably 0.1 to about 5.0% by weight of the polyester, and polythiol. Nearly stoichiometrical amounts of polythiol and unsaturated polyester, are usually used, but quite large deviations from stoichiometry can be tolerated and may be advantageous in some cases. The preferred polythiol is pentaerythritol tetrakis ($\beta$-mercaptopropionate) and the preferred photocuring rate accelerators are benzophenone and dibenzosuberone. The photocuring is achieved at a temperature between about 20° and about 100°C.

By the above photocuring process, the process and products from the curing of unsaturated polyester, resins on a practical scale is greatly improved. Photocurable compositions, as described above, can be formulated which are subject to a very high degree of control under commercially operable conditions. Compositions which have excellent shelf life during storage can be photocured through thick cross sections (250 mils or more) in very short time intervals under ambient conditions simply by exposure to a standard source of ultraviolet radiation (sunlight, UV lamp, sunlamps, and the like). Furthermore, the product of the photocuring reaction of the present invention differs substantially from similar products cured by methods of the prior art in terms of physical properties. Whereas the products obtained by prior art vinyl polymerization techniques are brittle, the corresponding products obtained by the thioether forming reaction of this invention are relatively less stiff, more flexible and more impact- or abuse-resistant.

As used herein, the term "reactive" unsaturated carbon to carbon groups means groups which will react under proper conditions as set forth herein with thiol groups to yield the thioether linkage

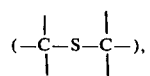

as contrasted to the term "unreactive" carbon to carbon unsaturation which means

groups when found in aromatic nuclei (cyclic structures exemplified by benzene, pyridine, anthracene, and the like) which do not under the same conditions react with thiols to give thioether linkages.

Other photocuring sources of actinic radiation, besides ultraviolet radiation, include electron beam radiation, laser beam radiation, etc.

The unsaturated polyester, of this invention are produced by the condensation reactions of organic acids or anhydrides with alcohols, An extremely important class of unsaturated linear polyesters are obtained by the reaction of glycols with unsaturated dicarboxylic acids and/or anhydrides or with mixtures of saturated and unsaturated dicarboxylic acids and/or anhydrides. The unsaturated diacids or their anhydrides provide the unsaturated double bonds in the polyesters necessary to copolymerize with the polythiol. Suitable unsaturated dicarboxylic acids are the aliphatic dicarboxylic acids, such as fumaric acid, maleic acid (preferred), chloromaleic acid, itaconic acid, etc. Suitable dicarboxylic acid anhydrides include maleic anhydride, citraconic anhydride, etc. The unsaturated polyesters of this invention can be prepared from diacid reactants which include saturated acids or their anhydrides (e.g., adipic acid, sebacic acid, azelaic acid, diglycolic acid, tetrabromophthalic acid, phthalic anhydride, chlorendic anhydride, etc.) to modify the properties of the cured products. In that case, enough unsaturated dicarboxylic acid an/or anhydride must be used so that each polyester molecule has at least two reactive -ene groups. Alternatively, an unsaturated dihydric alcohol can be used to furnish the reactive double bonds. If the dicarboxylic acids or anhydrides and dihydric alcohol are present in equimolar amounts, the equivalent weight of the polyester is determined by the extent of the condensation reaction. Better control of the molecular weight of the product is obtained by using an excess of one of the functional groups. The product is then terminated with carboxylic acid groups or with hydroxyl groups depending on which was in excess. These groups have a significant effect on the polarity of the polyester and on the properties of the cured products. An alternative way to limit the molecular weight of the polyesters is to incorporate monofunctional acids or alcohols preferably unsaturated, into the formulation. The resultant polyesters will then have terminal as well as internal unsaturation. Branched polymeric polyesters are produced by incorporating polycarboxylic acids or polyhydric alcohols with more than two functional groups into the system.

Specific examples of polymeric unsaturated polyesters useful in this invention are: poly (ethylene glycol maleate); poly(ethylene glycol fumarate); poly(diethylene glycol maleate); poly(triethylene glycol fumarate); poly(propylene glycol fumarate); poly(1,3-butylene glycol maleate); poly (dipropylene glycol fumarate); poly (tripropylene glycol; fumarate); poly(neopentylene glycol fumarate); poly(3-ethyl-1,3-hexanediol fumarate); poly(2,2,4-trimethyl-1,3-pentanediol maleate); poly(propylene oxide maleate); poly(ethylene oxide maleate); poly (epichlorohydrin maleate); poly(1,2-butylene oxide maleate; poly(cyclohexane oxide fumarate); poly(ethylene glycol chloromaleate); poly(ethylene fumarate); poly(tetraethylene glycol maleate); poly(ethylene propylene glycol maleate); poly(1,4-butylene glycol maleate); poly(2,2-dimethyl-1,3-propanediol fumarate); poly(1,4-cyclohexanel-dimethanol fumarate); poly(2,2,4,4-tetramethyl-1,3-cyclobutanediol maleate); poly(ethylene glycol citraconate); poly(ethylene glycol itaconate); and poly(ethylene glycol mesaconate).

Raw materials employed to make the polyesters, of this invention include, but are not limited to, unsaturated anhydrides and polyacids e.g., allyl derivatives of malonic acid, 3-butene, 1,2,3-tricarboxylic acid, dimer acid, dodecenyl succinic anhydride, endic anhydride, fumaric acid, itaconic anhydride, maleic anhydride, nonenyl succinic anhydride, polybutadiene dicarboxylic acid, tetrahydrophthalic anhydride, unsaturated acids; e.g., acrylic acd, crotonic acid, methacrylic acid, saturated anhydrides and polyacids; e.g., adipic acid, azeleic acid, phthalic anhydride, pyromellitic dianhydride, terephthalic acid, unsaturated polyols; e.g., allyl diethanolamine, 2-allyl-2-ethyl-1,3-propanediol, 1,4-butenediol, glycerol monoallyl ether, polybutadiene diol, trimethylolpropane monoallyl ether, unsaturated alcohols; such as allyl alcohol, 4-allyl-1,6-heptadien-4-ol, allyl hydroxyethyl ether, 3-buten-1-ol, 3-buten-2ol, crotyl alcohol, 9-decen-1-ol, 1,6-heptadien-4-ol, methallyl alcohol, methyltetrahydrobenzyl alcohol, pentaerythritol triallyl ether, 1,4-pentadien-3-ol, trimethylolpropane diallyl ether, saturated polyols; e.g., ethylene glycol, diethylene glycol, etc., propylene glycol, dipropylene glycol, etc. neopentyl glycol, trimethylolpropane, pentaerythritol.

The polar unsaturated polyesters, employed in the instant invention are an improvement over non-polar hydrocarbon dienes due to improved oxygen and ozone resistance, improved adhesiveness to substrates, and improved resistance to non-polar solvents such as hexane, kerosene, gasoline, hydrocarbon oils, greases and the like.

For the purpose of brevity the unsaturated polyesters, will hereinafter be referred to as polyenes.

As used herein, the term "polythiols" refers to simple or complex ester thiols having a multiplicity of pendant or terminally positioned —SH functional groups per average molecule.

On the average, the polythiols must contain 2 or more —SH groups per molecule. They usually have a viscosity range of slightly above 0 to 20 million centipoises (cps) at 70°C., as measured by a Brookfield Viscometer. Included in the term "polythiols" as used herein are those materials which in the presence of an inert solvent, aqueous dispersion or plasticizer fall within the viscosity range set out above 70°C. Operable polythiols in the instant invention usually have molecular weights in the range of about 152 to about 20,000, preferably about 100 to about 10,000. The polythiols operable in the instant invention can be exemplified by the general formula: $R_a$—$(SH)_n$ where $n$ is at last 2 and $R_a$ is a polyvalent organic moiety free from "reactive" carbon to carbon unsaturation. Thus $R_a$ may contain cyclic groupings and minor amounts of hetero atoms, such as N, S, P, or O but primarily contains carbon-hydrogen, carbon-oxygen, or silicon-oxygen containing chain linkages free of any "reactive" carbon to carbon unsaturation.

The class of polythiols operable with polyenes in the instant invention to obtain essentially odorless cured polythioether resins are esters of thiol-containing acids of the general formula: HS—$R_b$—COOH where $R_b$ is an organic moiety containing no "reactive" carbon to carbon unsaturated with polyhydroxy compounds of the general structure: $R_c$—$(OH)_n$ where $R_c$ is an organic moiety containing no "reactive" carbon to carbon unsaturation and $n$ is 2 or greater. These components will react under suitable conditions to give a polythiol having the general structure:

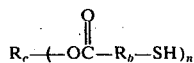

where $R_b$ and $R_c$ are organic moieties containing no "reactive" carbon to carbon unsaturation and n is 2 or greater.

Examples of the polythiol compounds preferred for this invention because of their relatively low odor level and fast curing rate include but are not limited to to esters of thioglycolic acid (HS—$CH_2$COOH), α-mercaptopropionic acid (HS—CH($CH_3$)—COOH) and β-mercaptopropionic acid (HS—$CH_2CH_2$COOH) with polyhydroxy compounds, such as glycols, triols, tetraols, pentaols, hexaols, etc. Specific examples of the preferred polythiols include, but are not limited to ethylene glycol bis(thioglycolate), ethylene glycol bis (β-mercaptopropionate), trimethylolpropane tris(thioglycolate), trimethylolpropane tris (β-mercaptopropionate), and pentaerythritol tetrakis (β-mercaptopropionate), all of which are commercially available. A specific example of a preferred polymeric polythiol is polypropylene ether glycol bis(β-mercaptopropionate) which is prepared from polypropyleneether glycol (e.g., Pluracol P2010, Wyandotte Chemical Corp.) and β-mercaptopropionic acid by esterification.

The polythiol compounds are characterized by a low level of mercaptan-like odor initially, and after reaction give essentially odorless cured polythioether end products.

As used herein, the term "odorless" means the substantial absence of the well-known offensive and sometimes obnoxious odors that are characteristic of hydrogen sulfide and the derivative family of compounds known as mercaptans.

The photocuring reaction can be initiated by ultraviolet (U.V.) radiation contained in actinic radiation from sunlight or obtained from special light sources which emit significant amounts of U.V. light. Thus it is possible merely to expose the unsaturated polyene and polythiol admixture to actinic radiation under ambient conditions or otherwise and obtain a cured solid elastomeric or resinous product. But this approach to the problem results in extremely long exposure times which cause the process in the vast bulk of applications to be commercially unfeasible. While it should be recognized that absorbed energy and the wavelength are the actual crucial factors, the length of irradiation is a good guide in obtaining a complete photocure. Chemical photocuring rate accelerators (photoinitiators or light sensitizers or activators) serve to drastically reduce the exposure times and thereby when used in conjunction with various forms of energetic radiation (containing U.V. radiation) yield very rapid, commercially practical cures by the practice of the instant invention. Useful photocuring rate accelerators include benzophenone, acetophenone, acenaphthene-quinone, methyl ethyl ketone, thioxanethen-9-one, xanthen-9-one, 7-H-benz[de]anthracen-7-one, dibenzosuberone, 1,naphthaldehyde, 4,4'-bis(dimethylamino) benzophenone, fluorene-9-one, 1'-acetonaphthone, 2'-acetonaphthone, 2,3-butanedione, anthraquinone, 1-indanone, 2-tert-butyl anthraquinone, valerophenone, hexanophenone, 8-phenylbutyrophenone, p-morpholinopropiophenone, 4-morpholinobenzophenone, 4'-morpholinodeseoxybenzoin, p-diacetylbenzene, 4-aminobenzophenone, 4'methoxyacetophenone, benzaldehyde, α-tetralone, 9-acetylphenanthrene, 10-thioxanthinone, 3-acetylphenanthrene, 3-acetylindole, 1,3,5-triacetylbenzene, etc., and blends thereof. The photocuring rate accelerators are added in an amount ranging from about zero (e.g., 0.0005) to about 10 percent by weight of the polyene and polythiol components in the instant invention. Benzophenone and dibenzosuberone are the preferred photocuring rate accelerators. Useful ultraviolet (U.V.) radiation has a wavelength in the range of about 2000 to 4000 Angstrom units. When ultraviolet radiation is used for the curing reaction a dose of 0.0004–6.0 watts/cm² is usually employed. If high energy ionizing irradiation is used e.g., electron beam a dose in the range of 0.01–10 megarads is employed at a dose rate of $1.0 \times 10^{-4}$–4000 megarads/second. Any radiation having an energy of greater than 3.0 electron volts is operable to cause the curing reaction of the instant invention.

The type and concentration of additives must be carefully selected so that the final composition remains photocurable under practical conditions of exposure and with commercially feasible time cycles maintained throughout the operation.

The compositions to be photocured in accord with the present invention may, if desired, include such additives as natural or synthetic resins, e.g., styrene, etc.; antioxidants; dyes, inhibitors; activators; fillers; pigments; antistatic agents; flame-retardant agents; thickeners; thixotropic agents; surface-active agents; light scattering agents; viscosity modifiers; extending oils; plasticizers; tackifiers; etc. Such additives are usually preblended with the unsaturated polyene or polythiol prior to or during the compoundng step. Operable fillers include natural and synthetic resins; carbon black; glass fibers; wood flour; clay; alumina; carbonates; oxides, e.g., $TiO_2$, etc., hydroxides; silicates; glass flakes; glass beads; borates; phosphates; diatomaceous earth, calcium sulfate; calcium carbonate; antimony oxide; colloidal carbon; titanium dioxide; various colored pigments; various silicas; powdered glass; etc. The additives may be present in quantities up to 500 parts or more per 100 parts by weight of photocurable composition, and preferably 0.0005 to 300 parts on the same basis.

The compounding of the components prior to photocuring can be carried out in any conventional manner. It may be desirable to admix the components in a suitable solvent system. Ethoxyethyl acetate is a suitable solvent in many instances. It should be noted herein that the term "solvent" includes not only organic solvents but also water and other aqueous systems (although when aqueous systems are used, the resultant admixture is usually an emulsion or dispersion).

It is important to select a sufficiently long irradiation or exposure time so as to completely cure the unsaturated polyesters. Aside from exposure time and light intensity, the extent of the exposure is dependent on the thickness of the polyester resin composition, the photocuring temperature, the structure and functionality of the polythiol and unsaturated polyester employed, the type and concentration of light sensitizer, the photocuring rate, the presence of light-absorbing pigments or dyes in the photocuring composition, etc. It has been observed that in most cases photocuring starts at the surface of the photocurable layer closest to the light source and proceeds inward. Inasmuch as the photocuring rate usually increases at higher temperatures, less exposure is required thereat than at room temperature. Thus ultraviolet light sources that emit heat, or the concurrent use of an infrared lamp with the UV lamps, etc., are more efficient than cold ultraviolet light sources. In general, the minimum length of the time necessary for a proper exposure (i.e., complete photocuring) is about 0.01 minute, and suitable exposure times gneerally range between about 10 seconds and about 4 hours, depending on the thickness of the photocurable film or layer, the intensity and wavelength distribution of the light source, concentration of photosensitizer, etc.

Various light sources can be used to obtain sufficient ultraviolet light to practice the instant invention. Such sources include carbon arcs, mercury arcs, fluorescent lamps with special ultraviolet light emitting phosphors, xenon arcs, argon glow lamps, and photographic flood lamps. Of these, the mercury vapor arcs, the sunlamp type, and the xenon arcs are very useful. The sunlamp and the mercury vapor arcs are customarily used at a distance of 7 to 10 inches from the composition, whereas the xenon arc is placed at a distance of 24 to 40 inches. The terms "essentially transparent" or "transparent" as used within the scope of this invention and in all cases includes the terms "transparent" and "translucent".

Other forms of actinic radiation, besides ultraviolet radiation, used to cure the systems of this invention include laser beams, gamma radiation, electron beams, etc. Peroxides and hydroperoxides, whether or not accelerated, iron, oxime esters, azo compounds, etc., can be used to initiate curing.

Cured unsaturated polyesters, have excellent electrical insulation properties and good overall chemical resistance, and can be molded as a layer or used in a laminated structure. Cured halogenated unsaturated polyesters have been termed "self-extinguishing" when formulated with conventional flame retardants.

The following examples will aid in explaining the instant invention. In all cases, unless otherwise noted, all parts and percentages are by weight.

EXAMPLE 1

20 Grams of dipropylene glycol maleate, 10 grams of "Mercaptate Q-43 Ester", and 0.15 gram of benzophenone were thoroughly admixed in a glass container. "Mercaptate Q-43 Ester" is a trade designation for pentaerythritol tetrakis (β-mercaptopropionate) and is commercially available from Carlisle Chemical Co. The admixture was spread in a film about 40 mils thick and irradiated with ultraviolet (U.V.) light from a Westinghouse sunlamp (No. RS 275 watt) delivering 4000 microwatts/cm² at the film surface at a distance of 10 inches for 25 minutes. The admixture was thoroughly photocured to a tough and flexible product.

EXAMPLE 2

Example 1 was repeated, except that 0.15 gram of acetophenone was used in place of the benzophenone. The admixture was thoroughly photocured to a tough product.

EXAMPLE 3

Example 1 was repeated, except that 10 grams of commercially available ethylene glycol bis(mercaptopropionate) i.e.,

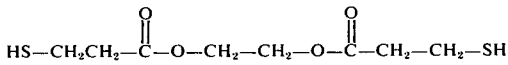

was used in place of the "Mercaptate Q-43 Ester". The admixture was thoroughly photocured to a tough and nontacky product.

EXAMPLE 4

Example 1 was repeated, except that 10 grams of trimethylolpropane tris (thioglycolate) was used in place of pentaerythritol tetrakis (β-mercaptopropionate). The admixture was thoroughly photocured to a tough and non-tacky product.

EXAMPLE 5

Example 1 was repeated, except that 10 grams of trimethylolpropane tris (β-mercaptopropionate) was used in place of pentaerythritol tetrakis (β-mercaptopropionate). The admixture was thoroughly photocured to a dimensionally stable and tough product.

EXAMPLE 6

Example 1 was repeated, except that 20 grams of the dipropylene glycol maleate was used. The admixture was thoroughly photocured to a tough product.

EXAMPLE 7

Example 1 was repeated, except that 16 grams of the condensation product of maleic acid and ethylene glycol, i.e.,

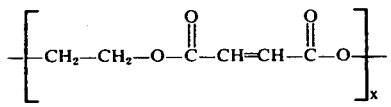

was used in place of the dipropylene glycol maleate. The admixture was thoroughly photocured to a tough and non-tacky product.

EXAMPLE 8

Example 1 was repeated, except that 10 grams of pentaerythritol tetrakis(thioglycolate) was used in place of penteaerythritol tetrakis (β-mercaptopropionate). The admixture was thorougly photocured to a tough product.

EXAMPLE 9

Example 1 was repeated, except that 0.15 gram of cyclohexanone was used as the photocuring rate accelerator (light sensitizer) in place of benzophenone. The admixture was thoroughly photocured to a tough product.

EXAMPLE 10

Example 1 was repeated, except that 0.15 gram of dibenzosuberone was used as the photocuring rate accelerator in place of benzophenone. The admixture was thoroughly photocured to a tough and non-tacky product.

EXAMPLE 11

Example 1 was repeated, except that 0.15 gram of methylethyl ketone was used as the photocuring rate accelerator in place of benzophenone. The admixture was thoroughly photocured to a tough and non-tacky product.

EXAMPLE 12

20 Grams of a copolymer based on diethylene glycol, propylene glycol, isophthalic acid and maleic acid (anhydride), 5 grams of "Mercaptate Q-43 Ester" and 0.15 gram of benzophenone were thoroughly admixed. The admixture was irradiated (for 25 minutes) as in Example 1. The admixture was thoroughly photocured to a tough product.

EXAMPLE 13

30 Grams of polyester resin used in Example 12, 5 grams of "Mercaptate Q-43 Ester" and 0.15 gram of benzophenone were thoroughly admixed. The admixture was irradiated (for 13 minutes) as in Example 1. The admixture was thoroughly photocured to a tough product.

EXAMPLE 14

Example 13 was repeated, except that 0.15 gram of dibenzosuberone was used in place of benzophenone. The admixture was thoroughly photocured to a tough product.

EXAMPLE 15

Example 12 was repeated, except that 20 grams of a blend (50/50 mixture) of the polyester resin used in Example 12 and styrene was used in place of the 20 grams of the polyester resin used in Example 12. The admixture was thoroughly photocured to a tough and non-tacky product.

EXAMPLE 16

Example 12 was repeated, except that half of the pentaerythritol tetrakis (β-mercaptopropionate) was replaced with 2.5 grams of ethylene glycol bis (β-mercaptopropionate). The admixture was thoroughly photocured to a tough and non-tacky product.

EXAMPLE 17

24 Grams of a copolymer prepared from diethylene glycol, propylene glycol, orthophthalic acid and maleic acid, 6 grams of "Mercaptate Q-43 Ester" and 0.15 gram of benzophenone were thoroughly admixed. The admixture was irradiated (for 20 minutes) as in Example 1. The admixture was thoroughly photocured to a tough and non-tacky product.

EXAMPLE 18

15 Grams of copolymer used in Example 17, 15 grams of "Mercaptate Q-43 Ester" and 0.15 gram of benzophenone were thoroughly admixed. The admixture was irradiated (30 minutes) as in Example 1. The admixture was thoroughly photocured to a tough product.

EXAMPLE 19

Example 17 was repeated, except that 24 grams of a blend (60/40) of the copolymer used in Example 17 and styrene was used in place of the 24 grams of the copolymer used in Example 17. The admixture was thoroughly photocured to a tough product.

EXAMPLE 20

Example 1 was repeated, except that the ultraviolet radiation source was replaced with an electron beam radiation source. A tough product was obtained.

EXAMPLE 21

3 Moles of 1,4-butenediol and 2 moles of maleic anhydride were admixed in a three-neck flask and maintained with vigorous stirring under a nitrogen blanket for 3 hours at 200°C. The water evolved was measured in a Dean-Stark trap. On cooling 424 g. of the hydroxyl terminated unsaturated polyester pentaendiol product was obtained.

The 424 g. of polyester product was admixed with 1 mole of pentaerythritol tetrakis (β-mercaptopropionate) commercially available from Carlisle Chemical Co. under the tradename "Q-43" and 14 g. of benzophenone as a photosensitizer A 20 mil thick film of the admixture was placed under a 275 watt sun lamp delivering 4000 microwatts/cm$^2$ at the film surface at a distance of 10 inches and irradiated with UV light for 30 minutes. The admixture was thoroughly photocured to a tough and flexible product.

EXAMPLE 22

4 Moles of 1,4-butenediol and 3 moles of phthalic anhydride were admixed in the three neck flask and maintained with vigorous stirring under a nitrogen blanket for 2 hours at 230°C. The water evolved was measured in a Dean-Stark trap. On cooling, 566 g. of the unsaturated polyester, poly(1,4-butenediol phthalate), was obtained.

The 566 g. of polyester product was admixed with 1 mole of pentaerythritol tetrakis (β-mercaptopropionate) and 16 g. of benzophenone as a photosensitizer. A 40 mil thick film of the admixture was placed under a 275 watt sun lamp delivering 4000 microwatts/cm$^2$ at the film surface at a distance of 10 inches and irradiated with UV light for 39 minutes. The admixture was thoroughly photocured to a tough and flexible product.

EXAMPLE 23

2 Moles of ethylene glycol and 3 moles of maleic anhydried were admixed in a three neck flask with vigorous stirring under a nitrogen blanket and maintained for 3 hours at 185°C. 2 moles of trimethylolpropane diallyl ether was added to the flask and the reaction was contained for 1 hour at 230°C with stirring. The water evolved was measured in a Dean-Stark trap. On cooling, 792 g. of the unsaturated polyester heptaene product was obtained.

The 792 g. of unsaturated polyester product was admixed with 2 moles of trimethylolpropane tris (β-mercaptopropionate) commercially available from Carlisle Chemical Co. under the tradename "P-33" and 24 g. of benzophenone. A 20 mil thick film of the admixture was placed under a 275 watt sun lamp delivering 4000 microwatts/cm$^2$ at the film surface at a distance of 10 inches and irradiated with UV light for 10 minutes. The admixture was thoroughly photocured to a tough and flexible product.

EXAMPLE 24

2 Moles of diethylene glycol and 3 moles of fumaric acid were admixed in a three neck flask and maintained with vigorous stirring under a nitrogen blanket for 3 hours at 185°C. 2 moles of hydroxyethyl acrylate were added to the flask and the reaction was continued with stirring for 1 hour at 230°C. The water evolved from the reaction was measured in a Dean-Stark trap. On cooling, 738 g. of the unsaturated polyester product was obtained.

The 738 g. of polyester product were admixed with 2 moles of ethylene glycol bis (β-mercaptopropionate) commercially available from Carlisle Chemical Co. under the tradename "E-23" and 20 g. of benzophenone as a photosensitizer. A 40 mil thick layer of the admixture was placed under a 275 watt sun lamp delivering 4000 microwatts/cm$^2$ at the layer surface at a distance of 10 inches and irradiated with UV light for 15 minutes. The admixture was thoroughly photocured to a tough and flexible product.

EXAMPLE 25

1 Mole of maleic acid, 2 moles of phthalic anhydride and 2 moles of an allyl glycidyl ether were admixed in a three neck flask and maintained with vigorous stirring under a nitrogen blanket for 2 hours at 150°C. On cooling, 640 g. of the unsaturated polyester product was obtained.

The 640 g. of the unsaturated polyester product were admixed with 1 mole of pentaerythritol tetrakis (β-mercaptopropionate) and 18 g. of benzophenone as a photosensitizer. A 40 mil thick layer of the admixture was placed under a 275 watt sun lamp delivering 4000 microwatts/cm$^2$ at the layer surface at a distance of 10 inches and irradiated with UV light for 10 minutes. The admixture was thoroughly photocured to a tough, flexible product.

What is claimed is:

1. A process for photocuring unsaturated polar polyesters which comprises:
   a. admixing (i) 30 to 95% by weight of a polar polyester containing two or more reactive unsaturated carbon to carbon bonds per molecule at least one of which is situated internally to the main backbone chain, said polyester consistng essentially of the condensation product of carboxylic acids with alcohols (ii) 5 to 70% by weight of an ester thiol having a molecular weight in the range 152 to 20,000 and which contains at least two sulfhydryl groups, the total combined functionality of the reactive unsaturated carbon to carbon bonds per molecule in the polyester and the sulfhydryl groups per molecule in the ester thiol being greater than 4, and (iii) 0.0005 to 10% by weight of a photocuring rate accelerator;
   b. exposing said admixture under ambient conditions to radiation having an energy greater than 3.0 electron volts whereby there is an addition of said sulfhydryl groups of said ester thiol to said reactive unsaturated carbon to carbon groups of said polar polyester resulting in a cured product.

2. A process as described in claim 1 wherein said radiation comprises electron beam radiation at a dosage in the range 0.01 to 10 megarads and a dose rate in the range $1.0 \times 10^{-4}$ to 4000 megarads/second.

3. A process as described in claim 1 wherein said radiation comprises ultraviolet radiation.

4. A process as described in claim 3 wherein said ester thiol is pentaerythritol tetrakis (β-mercaptopropionate).

5. A process as described in claim 3 wherein said photocuring rate accelerator is benzophenone or dibenzosuberone.

6. A process as described in claim 3 wherein said unsaturated polyester is dipropylene glycol maleate.

7. A product which comprises the photocured unsaturated polar polyester described in claim 1.

8. A composition of matter which comprises an admixture of (a) 30 to 95% by weight of a polar polyester containing two or more reactive unsaturated carbon to carbon bonds per molecule at least one of which is situated internally to the main backbone chain, said polyester consisting essentially of the condensation product of carboxylic acids with alcohols, (b) 5 to 70% by weight of an ester thiol having a molecular weight in the range 152 to 20,000 and which contains at least two thiol groups, the total combined functionality of the reactive unsaturated carbon to carbon bonds per molecule in the polyester and the thiol groups per molecule in the ester thiol being greater than 4 and (c) 0.0005 to 10% by weight of a photocuring rate accelerator.

* * * * *